United States Patent [19]

Chater-Lea

[11] Patent Number: 5,822,314
[45] Date of Patent: Oct. 13, 1998

[54] COMMUNICATIONS SYSTEM AND METHOD OF OPERATION

[75] Inventor: David Chater-Lea, Crowthorne, Great Britain

[73] Assignee: Motorola, Inc., Schaumburg, Ill.

[21] Appl. No.: 655,013

[22] Filed: May 29, 1996

[30] Foreign Application Priority Data

May 31, 1995 [GB] United Kingdom .................. 9511004

[51] Int. Cl.⁶ ........................... H04B 7/212; H04B 7/26; H04J 3/06
[52] U.S. Cl. ......................... 370/337; 370/347; 370/350; 370/516; 375/371; 455/13.2; 455/450; 455/517
[58] Field of Search .................................. 370/321, 324, 370/336, 337, 345, 347, 349, 350, 503, 506, 516, 519; 375/356, 362, 371; 455/11.1, 12.1, 13.1, 13.2, 67.1, 67.6, 422, 435, 437, 450, 502, 507, 509, 517, 524

[56] References Cited

U.S. PATENT DOCUMENTS

| | | | |
|---|---|---|---|
| 4,320,503 | 3/1982 | Acampora ............................. | 455/13.2 |
| 4,346,470 | 8/1982 | Alvarez, III et al. ................... | 370/324 |
| 4,472,802 | 9/1984 | Pin et al. ................................ | 370/350 |
| 4,800,560 | 1/1989 | Aoki et al. .............................. | 370/324 |
| 5,228,029 | 7/1993 | Kozin ..................................... | 370/350 |
| 5,293,380 | 3/1994 | Kondo .................................... | 370/350 |

FOREIGN PATENT DOCUMENTS 2277232 10/1994 United Kingdom .

Primary Examiner—Alpus H. Hsu
Attorney, Agent, or Firm—Wayne J. Egan

[57] ABSTRACT

A method of operation of a communications system, having first (10) and second communications units (12) communicating frame divided information via a relay device (11). The second communications unit (12) transmits a timing signal (step 106) to the first communications unit (10), containing timing information of received timing signals from the first communications unit(10). The first communications unit (10) calculates a timing offset (step 114) for the combined timing delay for transmissions to and from the second communications unit via the relay device and transmits the timing offset (step 116) to the second communications unit. The second communications unit (12) adjusts its timing (step 122) according to the received timing offset. A communications system includes a frame number offset indicator (27) for performing timing synchronisation between the communications units.

11 Claims, 4 Drawing Sheets

ENCRYPTION SYNCHRONIZATION
BY FRAME NUMBERING SYSTEM

1 TDMA FRAME=4 TIMESLOTS
(~56.67MS.)(FN=2 BITS)

1 MULTIFRAME=18 TDMA FRAMES
(=1.02s)(FN=5 BITS)

1 HYPERFRAME=60 MULTIFRAMES
(=61.2s)(FN=6 BITS)

16 BIT EXTENSION NUMBER
TO HYPERFRAME
(=46 DAYS)(FN=16 BITS)

TOTAL INITIALISATION
VECTORS: 29 BITS

COMMUNICATIONS SYSTEM AND METHOD OF OPERATION

FIELD OF THE INVENTION

This invention relates to communications systems and, in particular, to communications systems requiring timing synchronisation between communicating units. The invention is applicable to, but not limited to, communications systems using encryption algorithms.

BACKGROUND OF THE INVENTION

In many digital radio communications systems it is desirable to extend the range of communications in the system by means of a relay device, i.e. a repeater or gateway. Such a device is required to receive complete sets of information for processing purposes, i.e. a frame of information, from a first communications unit. The relay device processes the frame, for example to correct any bit errors detected by a forward error correction and detection mechanism, and re-transmits the frame to a second communications unit, possibly on a different frequency. However, employing such a range extension increases the time delay between the transmission and reception of the frame of information between the two communications units due to the additional processing involved.

If the communications resource of the digital radio communications system is divided into communications frames, i.e. time division frames, and the increased time delay exceeds a particular time threshold, a communications unit receiving communications via such a relay device may receive and attempt to recover incorrect frames.

In some mobile communications system, e.g. the European digital cellular system GSM (Groupe Special Mobile), a method of timing advance may be employed to ensure that the timing of the transmission and reception of communications frames compensates for any delay introduced. However, in such systems timing advance is only used to compensate for short timing delays due to the velocity of propagation of light, and the distance between communicating units, and the effect that such timing has within the batches of information. Timing advance does not address the problems of compensating for large timing delays due to signal processing at the transmitter, receiver and relay device where the signal delay extends over a number of information batches.

An additional problem exists when the information transmitted in the communications system contains the current timing parameters, i.e. a frame number, and this timing parameter is critical to the correct performance of some of its signalling or operational functions. In such a communications system, current timing advance techniques can not be used. Any transmissions using a timing advance technique would transmit on an incorrect frame, i.e. causing the inherent frame number to be incorrect. A typical operational function, using timing information inherent in the transmissions, is the encryption/decryption process within the Trans European Trunked Radio (TETRA) standard.

Thus, it is desirable to have a method for obtaining timing synchronisation between two communications units, in a communications system employing relay devices to extend the coverage range, when timing information is included in the transmissions. It would also be beneficial to have a communications system, employing a communications protocol, that accommodates for such a method for obtaining timing synchronisation.

SUMMARY OF THE INVENTION

In a first aspect of the present invention, a method of operation of a communications system having a first communications unit communicating frame divided information with a second communications unit, via a relay device, is provided. The method comprises the steps of a first communications unit transmitting a first timing signal to a second communications unit via the relay device. The second communications unit receives and processes the first timing signal to provide a second timing signal, wherein the second timing signal provides timing information on a frame number of the received first timing signal. The second communications unit transmits the second timing signal to the first communications unit via the relay device. The first communications unit receives the second timing signal, calculates a timing offset between the timing of the received second timing signal and the timing information contained within the received second timing signal. The timing offset is indicative of the combined timing delay for transmissions from the first communications unit via the relay device to the second communications unit and from the second communications unit via the relay device to the first communications unit.

Preferably, the method further includes the first communications unit transmitting the calculated timing offset to the second communications unit, and the second communications unit receiving the calculated timing offset and adjusting its timing, according to the received timing offset, to recover transmissions from the first communications unit. In a communications system using encryption the timing offset information is preferably generated in the form of a frame number offset value which is used to synchronise the timing between the first and second communications units before encryption is used. The timing offset information also facilitates correct operation of any other frame-specific signalling functions employed in the communications system, such as specific frames containing only signalling, which are interspersed among frames carrying mixed signalling and traffic.

In this manner, implementation of the timing (frame number) offset information compensates for any timing delays introduced when communicating through the relay device. Advantageously, communications using such a frame number system for encryption purposes are not adversely affected by such delays.

Preferably, the step of transmitting a second timing signal from the second communications unit to the first communications unit via the relay device is performed such that the second timing signal does not contain signalling functions that require information on timing offset in order to operate correctly.

In this manner, communications requiring accurate timing information for particular signalling functions are not adversely affected by such delays.

Preferably, timing synchronisation is re-determined either when the communication link between the second communications unit and the first communications unit is extended to include an additional relay device or when communications from the second communications unit switch to an alternative first communications unit via an alternative relay device.

In this manner, implementation of the timing (frame number) offset information compensates for any timing delays introduced when communicating to any other communicating unit through any number of relay devices.

In a second aspect of the present invention, a communications system is provided comprising a first communications unit communicating frame divided information with a second communications unit via a relay device. Communication between the second communications unit and the first communications unit is performed using a communication protocol. The communication protocol includes a frame number offset indicator for performing timing synchronisation between the first communications unit and the second communications unit.

In this manner, the communications system compensates for any timing delays introduced by relay devices in communications between the first and second communicating units.

A preferred embodiment of the invention will now be described, by way of example only, with reference to the drawings.

DETAILED DESCRIPTION OF THE DRAWINGS

Figure 1:
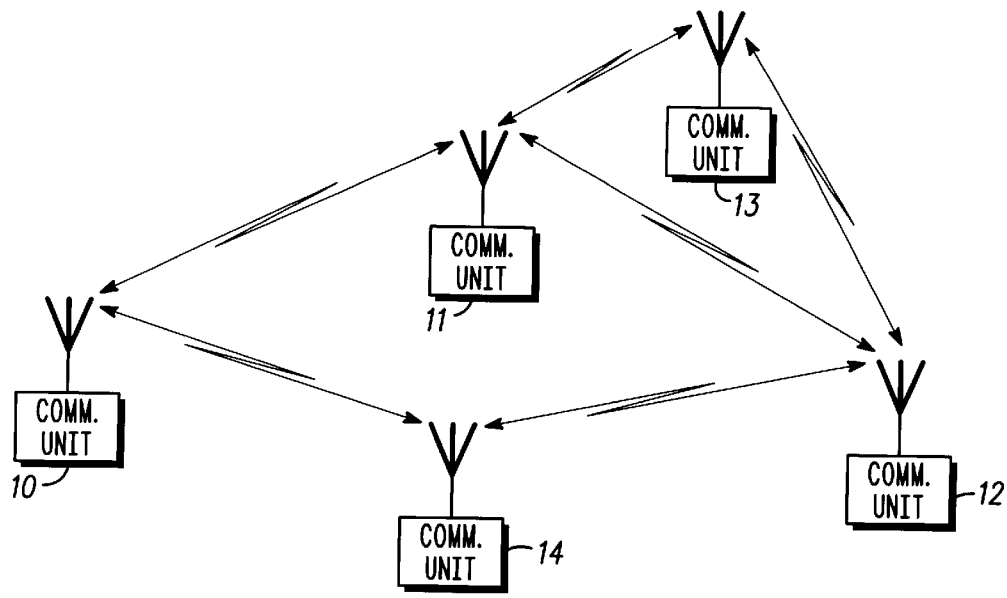
FIG. 1 is a block diagram of a communications system according to a preferred embodiment of the invention.

Referring first to FIG. 1, a block diagram of a communications system according to a preferred embodiment of the invention, is shown. In the preferred embodiment of the invention, the communications system comprises a first communications unit 10 communicating frame divided information to a second communications unit 12 via a relay device 11. It is within the contemplation of the invention that communications between the first communications 10 and the second communications unit 12 may also use additional relay devices such as relay device 13 or be switched via at least one alternative relay device 14.

Figure 2:
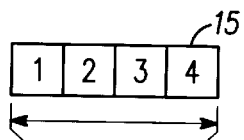
FIG. 2 is a timing diagram of a frame numbering system of the communications system according to a preferred embodiment of the invention.
Figure 2:
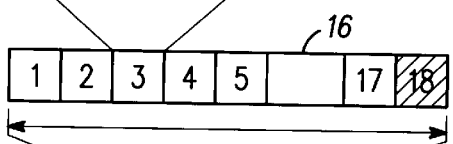
Figure 2:
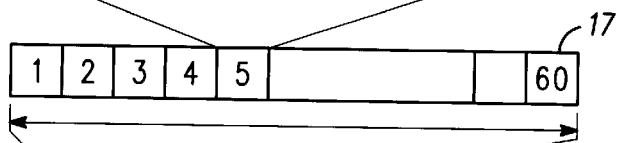
Figure 2:

Referring now to FIG. 2, a timing diagram of a frame numbering system of the communications system, according to a preferred embodiment of the invention, is shown. The timing diagram shows a time division multiple access (TDMA) method of dividing and combining batches of information associated with the Trans European Trunked Radio (TETRA) communications standard. A single information batch is shown as one time slot 15 in FIG. 2. In FIG. 2, a collection of four time slots constitutes one TDMA frame 16. A collection of eighteen TDMA frames 16 are combined to form one multiframe 17 and sixty multiframes 17 are combined to form one hyperframe 18.

In operation, in order to characterise a particular time slot 15 in a lengthy sequence of transmitted batches, each frame containing the four time slots 15 is allocated two-bits of the frame number. In effect, the frame number therefore specifies individual slots within each and every frame.

Four time slots, according to the preferred embodiment of the invention, contain 56.67msec's of information. The frame number (termed initialisation vector (IV) in TETRA when applied to an encryption process) comprises a sequence of binary bits, i.e. a '1' or a '0', to fully characterise any particular time slot 15. To characterise a particular time slot 15, within the four time slots in a TDMA frame 16, two binary bits are required, and to characterise a particular TDMA frame 16, out of the eighteen TDMA frames in a multiframe 17, five binary bits are required. To characterise a particular multiframe 17, out of the sixty multiframes in a hyperframe 18, six binary bits are required and to characterise a particular hyperframe 18, a sixteen bit extension is applied to the frame number to allow sixty five thousand, five hundred and thirty six individual hyperframes to be characterised. By way of further example, the composition of the IV, according to the preferred embodiment of the invention, is given by the following:

The first two bits IV(0) and IV(1) correspond to the slot number, and take values from 0 to 3; where value 0 corresponds to slot 1, and value 3 corresponds to slot 4. IV(0) is the least significant bit of the slot number.

The following five bits IV(2) to IV(6) correspond to the frame number; and take values from 1 (00001 binary) to 18 (10010 binary). IV(2) corresponds to the least significant bit of the frame number.

The next six bits IV(7) to IV(12) correspond to the multiframe number; and take values from 1 (00001 binary) to 60 (111100 binary). IV(7) corresponds to the least significant bit of the multiframe number.

The last 16 bits IV(13) to IV(28) correspond to an extension, that numbers the hyperframes. These can take all values from 00 to 65535. IV(13) corresponds to the least significant bit of the hyperframe numbering extension.

In this manner, the twenty nine bit frame number advantageously characterises each time slot, for a period of forty six days, before the frame numbering process has to start again.

Figure 3:
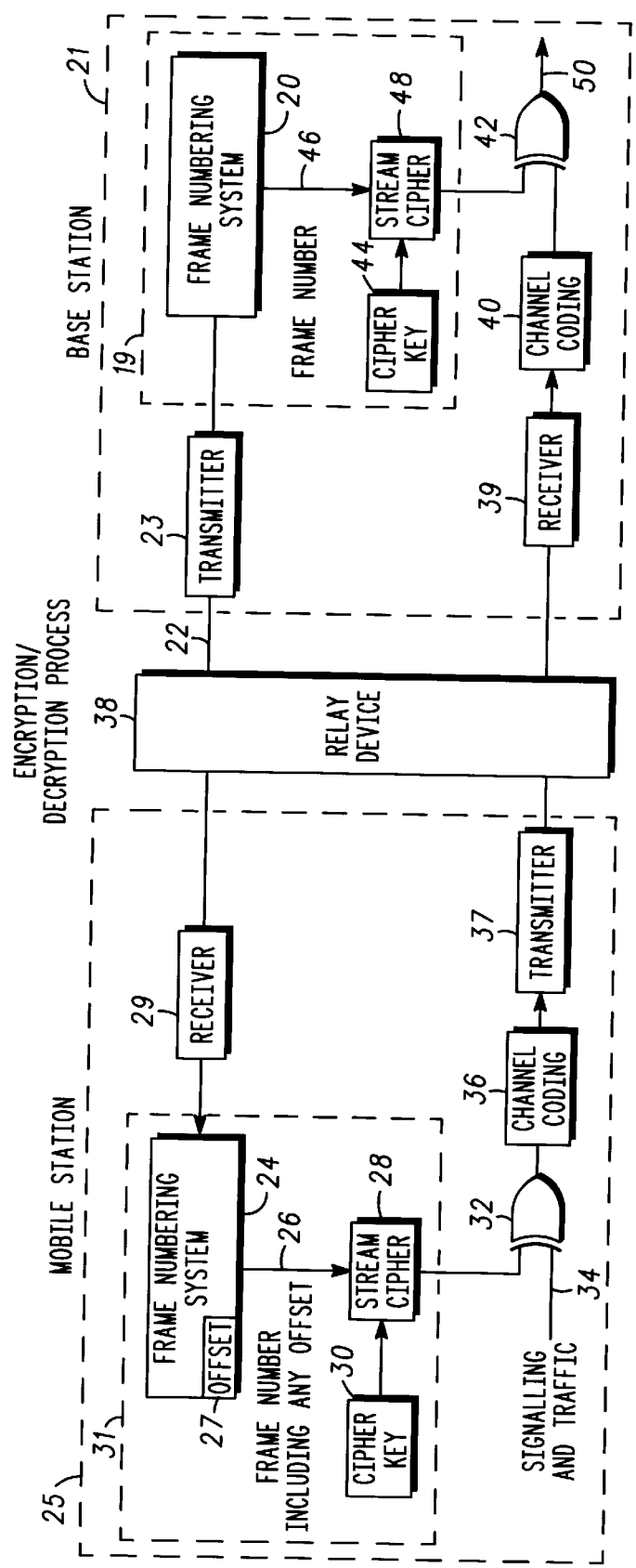
FIG. 3 is a block diagram showing an encryption/decryption process, according to a preferred embodiment of the invention.

Referring now to FIG. 3, a block diagram of an encryption/ decryption process, according to a preferred embodiment of the invention, is shown. The encryption/ decryption process is provided for in a communications system having a first communications unit, i.e. a base station (BS) 21, communicating frame divided information with a second communications unit, i.e. a mobile station (MS) 25, via a relay device 38. Communication between the two communications units is performed via a communication protocol. The communication protocol between the first communications unit (BS) 21 and the second communications unit (MS) 25 includes a frame number offset indicator 27 for performing timing synchronisation between the first communications unit (BS) 21 and the second communications unit (MS) 25.

By way of example only, traffic and signalling communications of the communications system of FIG. 3, are shown in the one direction, with communications from the MS 25, to the BS 21. The MS 25 comprises a key stream generator 31 that receives broadcast information 22 from a frame 25 numbering system 20, of the BS 21, via the relay device 38 and MS receiver circuitry 29. The key stream generator 31 comprises a frame numbering system 24 having a frame number offset indicator 27, a stream cipher 28 and a cipher key 30. The stream cipher is operably coupled to an XOR function 32, which also receives the signalling and traffic messages 34 to 30 be transmitted by the MS 25. The output of the XOR function 32 contains the embedded encrypted traffic and signalling information and is connected to a channel coding function 36 and transmitted, via MS transmitter circuitry 37 i.e. radio frequency up-conversion and power amplification circuits, via the relay device 38 to the BS 21. The signal 35 transmitted from the MS 25 is received at the BS 21, input to BS receiver circuitry 39, i.e. radio frequency down-conversion and amplification as known to those skilled in the art, and input to a channel decoding function 40. The output from the channel decoding function 40 is input to an XOR function 42. The BS 21 comprises a key stream generator 19 having a frame numbering system 20 providing frame number information 46 to a stream cipher 48 that also receives a cipher key 44. The output from the stream cipher 48 is also input to the XOR function 42 and the output of the XOR function 42 provides the decrypted information 50 of transmissions from the MS 25.

In operation, air interface encryption provides confidentiality on the digital radio link between the MS 25 and the BS 21. Initial transmissions between the BS 21 and the MS 25 are used to determine any timing offset value required by the MS 25 to ensure accurate timing of the received signals at the BS 21. The BS 21 broadcasts frame numbering information, from its frame numbering system 20, to all MSs of the communications system. When the MS 25 registers with the BS 21 it transmits the received frame number, provided by the BS 21, as part of its registration request. The BS 21 calculates any timing (frame number) offset, required to be implemented by the MS 25, in order to ensure correct timing of future transmissions from the MS 25 to the BS 21. Preferably the registration request does not include any frame-dependent signalling functions, e.g. encryption. The registration request is performed via a standard control channel and not as part of the signalling frame. In a preferred embodiment the BS 21 transmits the calculated frame number offset to the MS 25 and the MS 25 adjusts the timing of its transmissions to accommodate for this frame number offset, i.e. timing delays for the communication. Once the frame number offset between the first and second communications units has been determined and the frame number offset implemented in the second communications unit, normal encrypted communications take place.

In the preferred embodiment the encryption/decryption process operates by combining an encryption algorithm, i.e. a key stream generator (KSG) 31, with the contents of signalling and traffic (speech and/or data) messages 34 to be transmitted across the air interface. The KSG has an initial value (IV) from the frame numbering system 24, a timing offset value, provided by the BS to ensure accurate timing of received signals at the BS and a cipher key 30. The KSG produces a sequence of key stream bits, which are a mathematical function of the initial value (IV) which is modified by the frame number offset, and cipher key (CK). The key stream bits are modulo 2 added (XORed) with plain text bits in data, speech and control channels to obtain encrypted cipher text bits. An initial value (IV) is used to initialise the KSG at the start of every slot. The IV is a value 29 bits g represented as IV(0) to IV(28) based on the frame numbering system; where IV(0) is the least significant bit and IV(28) is the most significant bit of the initialisation vector (IV).

Figure 4:
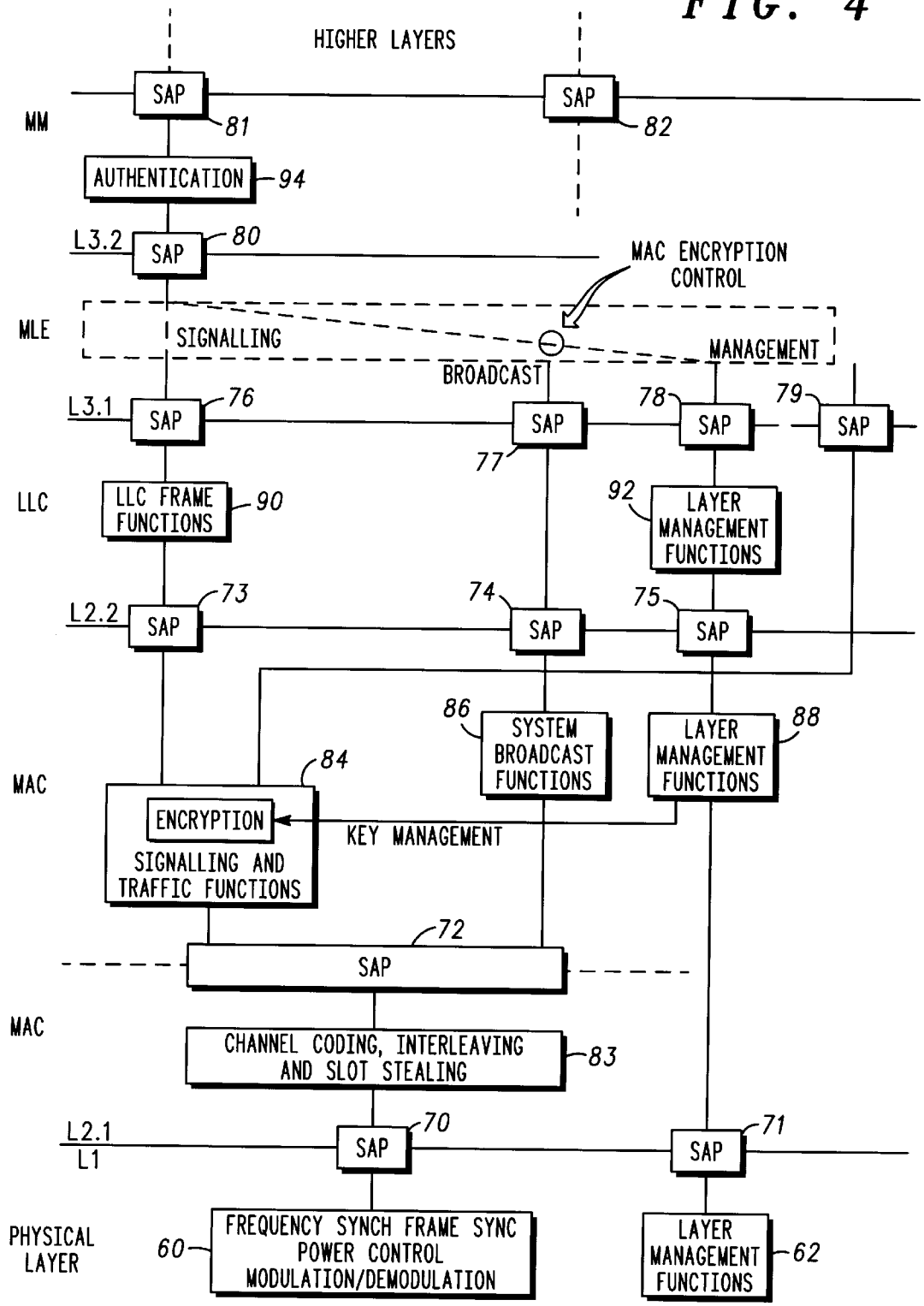
FIG. 4 is a block diagram of a protocol stack of the communications system in accordance with the preferred embodiment of the invention.

Referring now to FIG. 4, a block diagram of a mobile station (MS) protocol stack, in accordance with the preferred embodiment of the invention, is shown. The protocol stack has a number of signal management layers i.e. a physical layer, a medium access control (MAC) layer, a logical link control layer (LLC), a mobile link entity layer (MLE) and a mobility management layer (MM). Each layer is interconnected via service access points (SAPs) 70 to 82 and has layer management functions 62, 88 and 92 respectively. The physical layer of the protocol stack comprises radio specific functions 60 such as frame synchronisation, frequency synchronisation, power control and modulation/demodulation. The MAC layer comprises a channel coding, interleaving and slot stealing function 83, system broadcast functions 86 and the signalling and traffic functions 84 that contain the encryption/decryption processes. The LLC comprises the LLC frame functions 90, and the MLE is responsible for passing control information received from MM and higher layers down the protocol stack to the LLC; and vice versa. In the preferred embodiment of the invention the MAC encryption is controlled by MM commands passed down the protocol stack. Authentication procedures 94 occur in the MM layer.

In operation, once a link has been established with a base station (BS) by MLE under control of MM, MM may use authentication functions to authenticate communications from the MS to the BS. This authentication process will result in the generation of a derived cipher key (DCK) which will be used in the encryption process. This DCK is passed via the MLE and layer management functions to the MAC. The MM can then send a message to the MAC via the MLE and layer management functions, which will start operation of the encryption process. The encryption process in the MAC will use the KSG to produce an output which is mathematically derived from the DCK and from the IV that has been received in the MAC from broadcasts from the BS in the form of frame numbering information.

Figure 5:
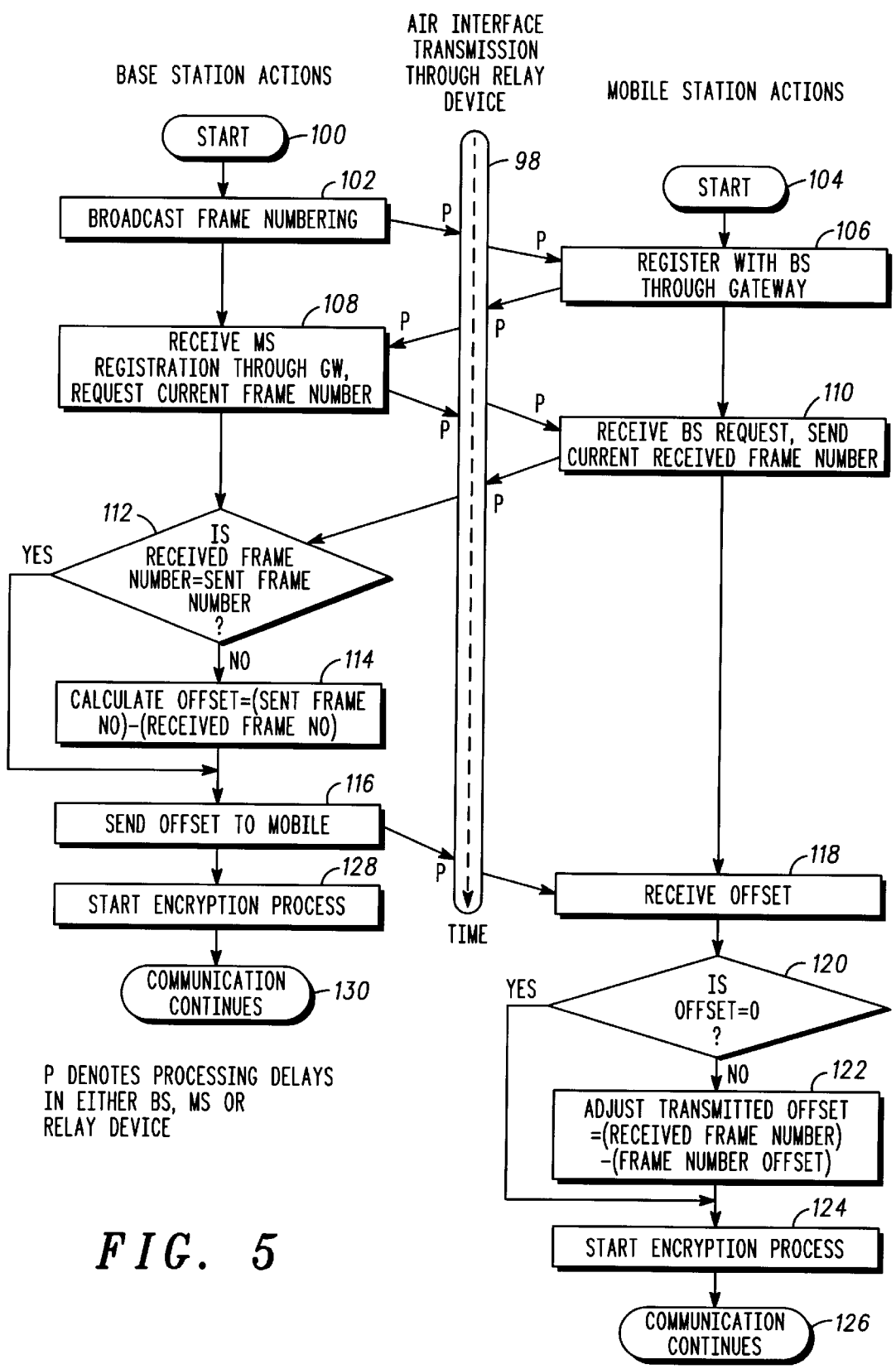
FIG. 5 is a flowchart showing the timing of communications within the communications system in accordance with the preferred embodiment of the invention.

Referring now to FIG. 5, a flowchart of the timing of communications within the communications system, in accordance with a preferred embodiment of the invention, is shown. The preferred embodiment of the invention is described with regard to achieving timing synchronisation between two communications units that use encrypted communications. However, it is within the contemplation of the invention that timing offset information, and in particular frame offset information, is similarly used for correct operation of alternative frame specific signalling functions that are employed in the communications system.

The flowchart shows a method of operation of a communications system having a first communications unit communicating frame divided information with a second communications unit via a relay device. In FIG. 5, the first communications unit, i.e. a base station (BS), commences communications, in step 100, by broadcasting a first timing (frame numbering) signal to the second communications unit, i.e. a mobile station MS, via the relay device 98, as shown in step 102. A processing delay 'P' occurs at the relay device 98, before the transmission continues to the MS. The MS receives and processes the first timing (frame numbering) signal and transmits a registration request to the BS, as shown in step 106. The BS receives the registration request of the MS and replies by requesting a current frame number, as in step 108. The MS receives the frame number request and transmits to the BS the current received frame number, as shown in step 110.

It is within the contemplation of the invention that steps 106 and 110 may be combined by transmitting a single second timing signal to the BS, wherein the second timing signal is a registration request which provides timing information on a frame number of the received first timing signal. With such an implementation, step 108 does not request a current received frame number.

Preferably, the MS transmissions requesting registration and informing the BS of current received frame numbers do not contain frame-dependent signalling functions that require accurate timing information in order to operate correctly, i.e. frame numbering encryption algorithms.

The MS transmits the second timing signal to the BS via the relay device 98, and the BS receives the registration request and compares the frame number of the received second timing signal to the frame number of the transmitted first timing signal, as shown in step 112. If the frame numbers are equal, no timing offset (frame number offset) is required and the process moves to step 116. If the frame numbers are different the BS calculates a frame number offset value, as in step 114. The frame number offset value is indicative of the period between the timing of the received second timing signal and the timing information contained within the received second timing signal, i.e. the timing of the transmitted first signal. Hence, the frame number offset value indicates the "round-trip" delay of communications, to the MS and from the MS, via the relay device 98, including all processing delays. The occurrence of the various processing delays 'P' in FIG. 5 are provided to highlight the extent of "round-trip" timing delays and are not shown to scale in the flowchart.

In a preferred embodiment of the invention, the BS transmits the calculated frame number offset to the MS, via the relay device 98, as shown in step 116. The MS receives the frame number offset value as shown in step 118. If no frame number offset is required, as in step 120, the process moves to step 124. If a frame number offset is required in step 120 the MS adjusts its processing according to the frame number offset, in order to recover transmissions from the BS. Once synchronisation has been obtained, the BS and MS start the encryption process, as in steps 124 and 128, and the encrypted communication continues, as shown in steps 126 and 130.

In this manner, timing synchronisation between the BS and the MS via a relay device 98, is achieved. Advantageously the frame dependent signalling functions that require accurate knowledge of the frame timing of signals, e.g. frame numbered encryption, can continue. A further example of a frame dependent signalling function is found in the eighteenth TDMA frame of the TETRA standard which is reserved purely for signalling operations and is not used as part of the registration process.

In a preferred embodiment of the invention, timing synchronisation is re-determined when the communication link between the BS unit and the MS is extended to include an additional relay device. Timing synchronisation is also re-determined when the MS transfers its communication link to alternative BSs, possibly via one or a number of alternative relay devices, in order to continue its communication.

Thus, a method is provided for obtaining timing synchronisation between two communications units, in a communications system employing relay devices, when timing information is included in the transmissions. A communications system, employing a communications protocol that accommodates such a method of obtaining timing synchronisation, is also given.

I claim:

1. A method of operation of a communication system having a first communications unit communicating frame divided information with a second communications unit via a terrestrial relay device, the method comprising the steps of:

transmitting a first timing signal from the first communications unit to the second communications unit via the terrestrial relay device, receiving and processing the first timing signal at the second communications unit to provide a second timing signal, wherein the second timing signal provides timing information on a frame number of the received first timing signal, transmitting the second timing signal from the second communications unit to the first communications unit via the terrestrial relay device, receiving the second timing signal at the first communications unit, and calculating, at the first communications unit, a timing offset between the timing of the received second timing signal and the timing information contained within the received second timing signal, wherein the timing offset is indicative of the combined timing delay for transmissions from the first communications unit via the terrestrial relay device to the second communications unit and from the second communications unit via the terrestrial relay device to the first communications unit.

2. A method according to claim 1, further comprising the steps of:

transmitting the calculated timing offset from the first communications unit to the second communications unit, receiving the calculated timing offset at the second communications unit, and adjusting the timing at the second communications unit for recovery of transmissions from the first communications unit according to the received timing offset provided by the first communications unit.

3. The method according to claim 1, wherein timing offset information is generated as a frame number offset value and wherein the frame number offset value is used to synchronise frame dependent signalling functions between the first and second communications units.

4. The method of claim 3 wherein the frame dependent signalling functions include at least one of encryption and decryption.

5. The method according to claim 1, wherein the first communications unit is a base station and the second communications unit is a mobile station and wherein the second timing signal includes a registration request from the mobile station to the base station for registering on the communications system provided at the base station.

6. The method according to claim 1, wherein timing offset information is used for correct operation of frame specific signalling functions employed in the communications system.

7. The method according to claim 1, wherein the step of transmitting a second timing signal from the second communications unit to the first communications unit via the terrestrial relay device, includes the step of removing, from the second timing signal, signalling functions that require information on timing offset in order to operate correctly.

8. The method according to claim 1, wherein timing synchronisation is re-determined when the communication link between the second communications unit and the first communications unit is extended to include an additional terrestrial relay device.

9. The method according to claim 1, wherein timing synchronisation is re-determined when the second communications unit transfers its communication link to an alternative first communications unit via an alternative relay device.

10. The method according to claim 1, wherein the communications system is the Trans European Trunked Radio (TETRA) system.

11. A communications system comprising:

a communication protocol for communication between communications units having a frame number offset indicator for performing timing synchronisation between said communications units a first communications unit having a transmitter for communicating a first timing signal in frame divided information to a second communications unit via a terrestrial relay device using the communication protocol, a receiver for receiving a second timing signal transmitted by the second communications unit and a processor for calculating a timing offset between the timing of a received second timing signal and timing information contained within the received second timing signal, wherein the timing offset is indicative of the combined timing delay for transmissions between the first and second communications units, and the second communications unit having a receiver operably coupled to a processor for receiving and processing the first timing signal at the second communications unit to provide a second timing signal, wherein the second timing signal provides timing information on a frame number of the received first timing signal, and a transmitter for transmitting the second timing signal from the second communications unit to the first communications unit via the terrestrial relay device.

* * * * *